Aug. 14, 1962  E. U. LANG  3,049,308
FESTOON CONTROL SYSTEM FOR HAUL-OFF APPARATUS
Filed Jan. 21, 1960  3 Sheets-Sheet 1
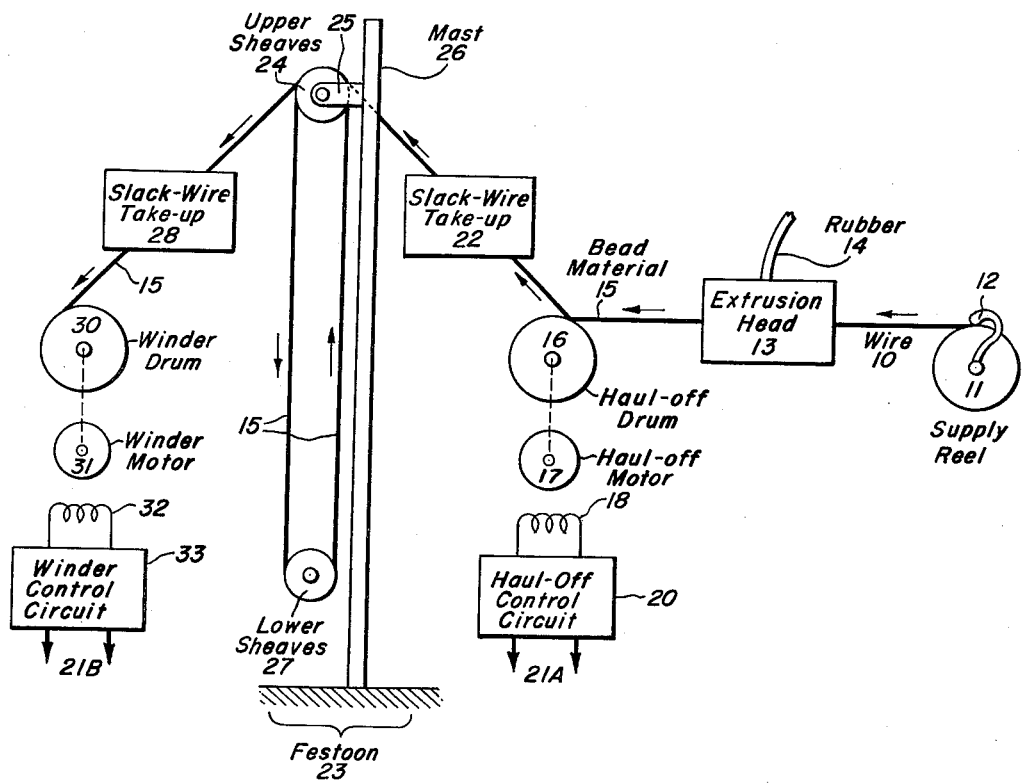
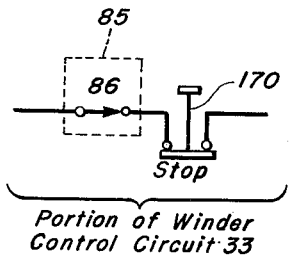
INVENTOR.
Ernest U. Lang

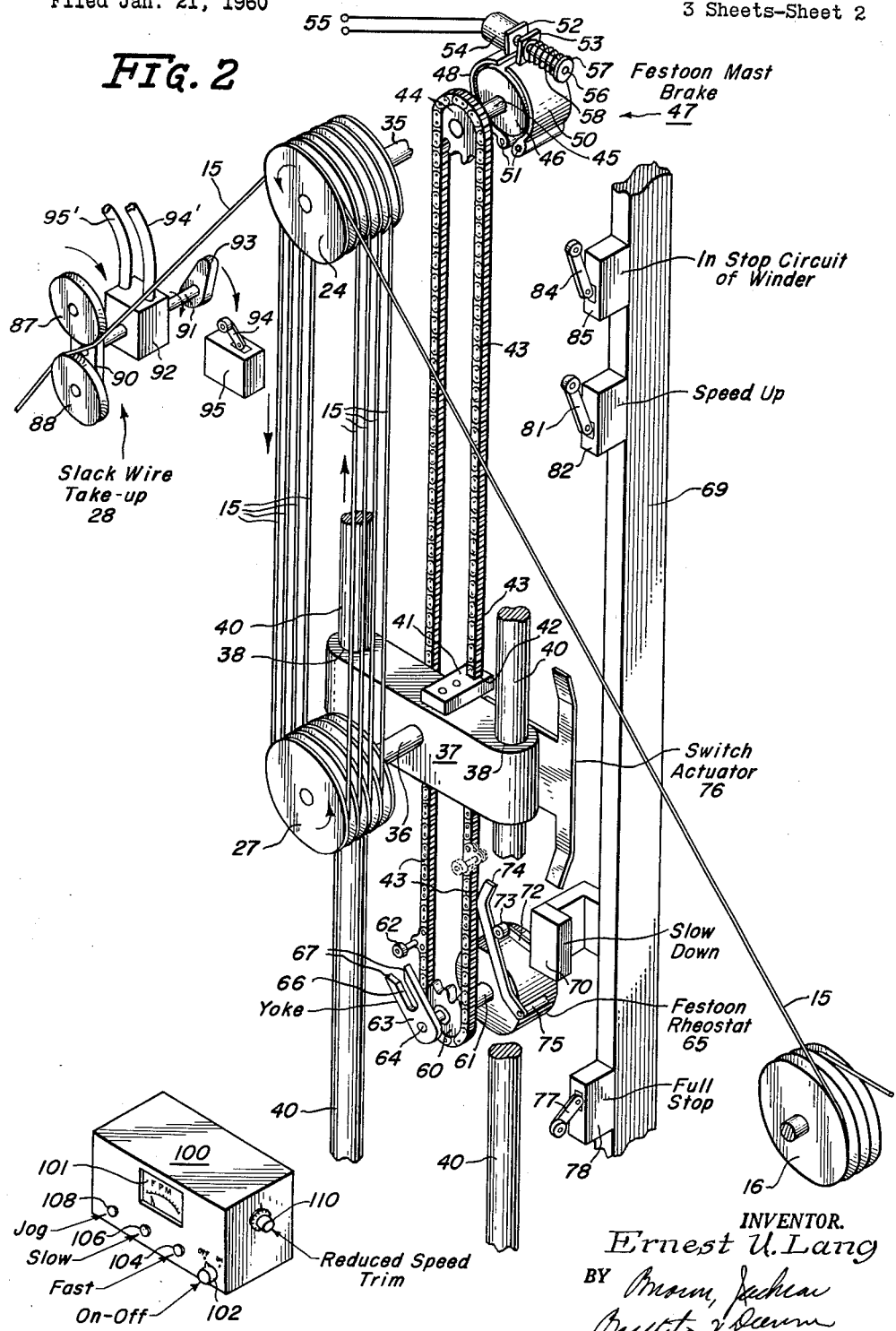

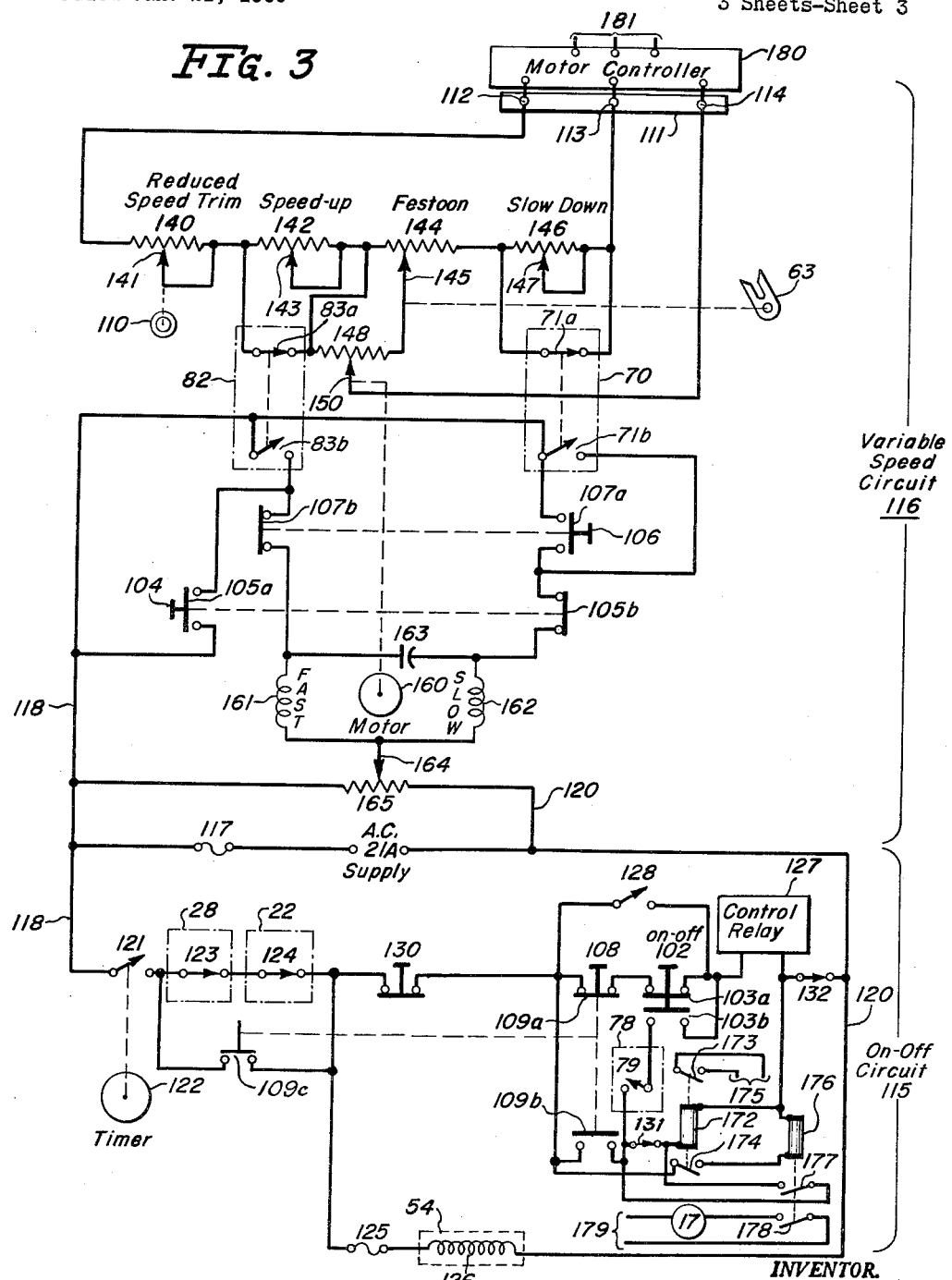

United States Patent Office 3,049,308
Patented Aug. 14, 1962

3,049,308
FESTOON CONTROL SYSTEM FOR
HAUL-OFF APPARATUS
Ernest U. Lang, Niles, Mich., assignor to National-Standard Company, Niles, Mich., a corporation of Delaware
Filed Jan. 21, 1960, Ser. No. 3,774
11 Claims. (Cl. 242—45)

This invention is directed to a control system for haul-off apparatus, and more particularly to a control system including a festoon or material storage structure having a variable dimension which receives material at a feed or input rate determined by the haul-off apparatus and discharges material at a variable output rate to satisfy varying load demands, and which modulates the input rate to prevent changes in the variable dimension beyond predetermined tolerance limits.

In the production of many types of rubber tires for automobiles, trucks, aircraft, or other uses, it is desirable to strengthen the innermost portion of the tire which fits adjacent the rim with a reinforced section which is known in the art as a "bead." The production technique for fabricating such a bead is now well known and understood in the art, and in one well known arrangement comprises feeding an extrusion head with both a rubber material and with a continuous wire which is pulled off a supply reel by a motor-driven haul-off drum against the retarding force of a let-off apparatus. The wire is coated with a rubber sheath in its passage through the extrusion head, and a motor-driven winder drum pulls the rubber-sheathed wire over a material storage structure having a variable dimension, such as a festoon, which may include an upper and a lower set of sheaves, with the uppper set of sheaves supported from an upstanding mast. As the motor-driven winder drum rotates the bead material is drawn from the festoon; the reinforced bead is built by winding a preassigned number of convolutions of the bead material onto the winder drum. For example, to construct a reinforced bead of five turns of bead material, the winder motor is energized to rotate the winder drum through five complete revolutions, and then stopped; the bead material is severed from the finished bead, and the bead removed from the winder drum preparatory to the next cycle of operations.

With automatic type winder operation a single bead can be constructed in a very short time interval, for example, in three seconds. In automatic operation the haul-off motor is operated at a nearly constant speed while material is pulled from the festoon and wound around the winder drum at variable rotational rates in each cycle. The winder requires an increasing supply of material as its speed is rapidly increased beyond that of the haul-off drum in the initial portion of the cycle, a decreasing supply for the next portion of the cycle as the winder is decelerated to a speed less than the haul-off drum speed, and no supply of material for the third portion of the cycle when the winder is stopped to permit removal of the bead. As to the haul-off drum, however, it is desired to provide only minute corrections by varying its speed so that the extrusion of the rubber is least affected during the bead-building cycle. Thus there is a wide divergence in the operational requirements of the winder and the haul-off drum. Accordingly festoon equipment is located between the two drums, and the raising and lowering of the lower set of sheaves in the festoon, or the change in the variable dimension of the material storage device, as the winder demands more or less bead material per unit time, permits the winder requirements to be fulfilled while yet maintaining a regulated speed of the haul-off drum. In certain arrangements, and particularly winding arrangements which operate at high speeds, the oscillations of the lower set of festoon sheaves may become excessive, the lower sheaves either rising to the upper set or falling as low as the supporting platform of the festoon structure.

In another type of winder operation, known in the art as "Universal" operation, the winder is run at a nearly constant speed for a period which may be as short as a few seconds or of a duration exceeding a minute; the winder then is stopped for a period of approximately two to ten seconds to permit manual removal of the finished bead from the machine prior to initiation of the next cycle of operation. Even during the period in which the winder machine is completely stopped, the haul-off drum preferably should operate at a speed controlled within limits much less than the variation of winder speed, and in the interest of preventing the formation of "bubbles" or "lumps" on the rubber sheath in the extrusion head during the idle or down time of the winder, it is desirable to maintain some movement by the haul-off drum at all times. To maintain such movement it is desirable that the interval required to brake the winder drum, remove the formed bead, and commence the next cycle of bead-building be sufficiently short so that the lower set of sheaves does not fall through its entire possible length of travel before the winder drum speed again exceeds the haul-off drum speed. Obviously Universal operation of the winder imposes different requirements for speed control of the haul-off drum as contrasted with automatic operation, and a feature of the invention is the simple and positive manner in which the inventive structure can be utilized with either type of operation simply by shifting an actuator member, such as a lug, from one to another position on a driven member, such as a chain, which is positioned in relation to the position of the lower set of sheaves during each cycle of operation.

It is an object of the present invention to limit the extent of oscillation of the lower set of sheaves to a safe amount during each cycle of the winder operation.

It is another object of the invention to limit such oscillation by providing changes in the speed of the haul-off drum, which changes depend upon the location of the lower sheaves in the festoon.

It is a further object of the invention to provide such control of the haul-off speed without substantially affecting the quality or consistency of the bead material produced at the extrusion head.

A particular object of the invention is to effect such regulation of the haul-off speed by a structure which requires only one rapid and simple adjustment for conversion between automatic winder operation and Universal type operation.

Yet another object of the invention is to apply such regulation to a Universal winder in such a manner that some movement of the haul-off drum is maintained even when the winder is completely stopped to permit manual removal of the bead.

The foregoing objects are attained by applying the inventive teaching to a conventional bead-building system comprising an input means or haul-off drum operable to feed at least one strand of material to a material storage device or a festoon including stationary upper sheaves and lower sheaves vertically movable between two extreme positions for storing thereon bead material received from the haul-off drum. An output means or winder draws material from the festoon at a variable velocity to satisfy variable load demands; when the winder velocity differs from the speed at which the haul-off feeds material to the storage device, the amount of material stored on the festoon changes, as does the distance between the upper and lower sheaves. In a preferred embodiment, the invention comprises means positioned adjacent the festoon or material storage device to adjust the feed velocity of the haul-off drum toward the value of the winder velocity responsive to actuation by the lower sheaves at a preassigned interval in its vertical movements.

Such operation may be achieved, for example, by arranging a chain to be driven in relation to vertical displacement of the lower sheaves, and attaching an actuator or lug to the chain which is then driven along a preassigned path as determined by the chain movement. The haul-off speed control means may include a festooon rheostat connected in the control circuit which governs the speed of the haul-off drum, and a yoke or second actuator may be affixed to adjust the effective resistance of the festoon rheostat at a preassigned interval in the lower sheave movement, the yoke being positioned so that the lug strikes the yoke and changes the effective resistance of the festoon rheostat to provide a corresponding change in the speed of the haul-off drum.

Other refinements of the control system include the provision of additional resistances in the control circuit, which may be selectively inserted, short-circuited, or adjusted to vary the speed of the haul-off drum as a function of the position of the lower sheaves, and/or in answer to commands transmitted by the operator of the equipment.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIGURE 1 is an illustrative showing of certain elements utilized in a bead-building system;

FIGURE 2 is a perspective illustration of a festoon structure and associated control elements useful in understanding the operation of the invention;

FIGURE 3 is a schematic diagram of a control system for use in conjunction with the festoon arrangement of FIGURE 2 to regulate a haul-off motor in accordance with the inventive teaching; and FIGURE 4 is a partial schematic diagram of certain elements of the control circuit for the winder.

General Description

FIGURE 1 is a general illustration of a system utilizing a bead-building structure including the novel control system, the direction of material flow being from right to left therein. A supply of wire 10 is shown being drawn from a supply reel 11 against the retarding force of a let-off finger 12, and being fed into an extrusion head 13, which is also supplied with rubber material 14. The wire 10 is coated with a rubber sheath within the extrusion head in a manner well known and understood in the art, and the rubber-sheathed wire 15, hereinafter termed bead material, is pulled from the extrusion head over a haul-off drum 16 which is driven by a haul-off motor 17. The speed of motor 17 in the illustrated embodiment is controlled by adjusting the energization of field winding 18, a control circuit 20 being coupled between field winding 18 and a pair of supply conductors 21A to regulate the energization level of field winding 18 and thus the speed of haul-off drum 16.

A first slack wire take-up 22 is shown interposed between haul-off drum 16 and the upper portion of festoon 23. The block representation of take-up 22 indicates a device which is effective to maintain tension in the bead material between haul-off drum 16 and an upper set of sheaves 24 of the festoon, and when the amount of slack exceeds a preset value, to stop the haul-off motor. The structure and operation of such slack wire control means, as well as a novel brake mechanism for cooperation with such slack wire control, is set forth and claimed in the copending application of Donald H. Shook, entitled "Slack-Wire Control System for Festoon," filed May 5, 1960, Serial No. 27,134, and assigned to the assignee of the present invention.

Upper sheaves 24 of the festoon arrangement are independently journalled on a shaft which is supported at one end of a horizontal bracket 25, the other end of which is affixed by bolts or similar means to an upstanding mast 26. A lower set of sheaves 27 are also independently journalled on a shaft which is not affixed to the mast, but is free to rise and fall as the amount of bead material stored on the festoon is varied.

As the bead material is pulled from the festoon, it passes over another slack wire take-up 28, and thence is drawn around winder drum 30 to shape a tire bead. The slack wire take-up device 28 is also shown and described in detail in the above-referred to application Serial No. 27,134. Drum 30 is driven by a winder motor 31, which includes a field winding 32, the energization level of which is controlled by a winder control circuit 33 connected between field winding 32 and supply conductors 21B. Although regulation of the field winding is depicted as the speed regulating means for the winder and haul-off motors, such showing is only for purposes of explanation of the system operation. Those skilled in the art will recognize that control of the armature voltage, or the sequential regulation of armature voltage and field voltage, can readily be utilized in the speed regulation of the haul-off and/or winder motors.

As the system of FIGURE 1 is energized and driven through a single bead-building cycle, the velocity of output means or winder drum 30 is varied above and below the feed velocity of input means or haul-off drum 16. The distance between the upper sheaves, which are free to rotate but otherwise fixed in position, and the lower set of sheaves, which is movable in the vertical direction, is varied to accommodate a varying amount of stored bead material whenever the velocity of take-off differs from the rate at which the haul-off feeds a strand of material to the festoon. This change in vertical distance between the two sets of sheaves as the amount of stored bead material is varied will be better understood in connection with the showing of FIGURE 2.

Structural Description

To illustrate the cooperation and coordination between the several elements of the inventive combination as the lower set of sheaves is moved upwardly and downwardly during one cycle of operation, the structural supporting equipment has been largely omitted from the perspective illustration of FIGURE 2. Additionally, the electrical switches controlled by the illustrated mechanical equipment, as well as the associated electrical circuitry, have also been omitted but are shown in their entirety in FIGURE 3. Only one of the two slack wire control arrangements is depicted in FIGURE 2, but the other arrangement is similar in structure and operation to the one there illustrated and described hereinafter.

In the embodiment of FIGURE 2, the upper set of sheaves 24 includes five separate sheaves or pulleys independently journalled on a shaft 35 which is mounted in a conventional manner in a supporting member, not illustrated. The lower set of sheaves 27 in the illustrated embodiment includes four separate sheaves or pulleys independently journalled on a shaft 36 which is fixedly mounted in a sheave support 37. Support 37 is weighted to normally urge lower sheaves 27 downwardly to a position of maximum displacement with respect to the upper sheaves. A pair of cylindrical bores 38 in sheave support 37 are sized to receive a corresponding pair of guide bars 40 and sheave support 37 is free to move vertically thereon. Manifestly lateral and transverse movement of the sheave support is precluded by guide bars 40.

A lug 41 has one end therof fixedly secured to the upper surface portion of sheave support 37, for example by welding, and an aperture 42 in the opposite end receives a chain 43 which is secured to lug 41 by bolt, welding, or similar means. The upper end of chain 43 passes over a sprocket wheel 44 which is secured on a shaft 45 by a key or other suitable means. Shaft 45 carries a brake drum 46 of festoon mast brake assembly 47, which assembly additionally includes a pair of brake shoes 48 and 50, each of which includes a bolt hole 51 in its lower portion to provide for fastening to the supporting structure (not shown) in an obvious manner. Brake shoe 48 includes an upstanding flange 52, and a similar flange 53 extends upwardly from brake shoe 50. A solenoid 54, including a pair of leads 55, is affixed to flange 52 and solenoid plunger or actuator 56 extends through each of flanges 52 and 53 and supports a collar 57 at its end. A bias spring 58 is positioned along plunger 56 to normally urge brake shoes 48 and 50 together and thus lock shaft 45 against rotation. Manifestly when shaft 45 is locked against rotation by operation of brake 47, chain 43 is locked at sprocket wheel 44, and lug 41 prevents movement of lower sheaves 27.

The lower end of chain 43 passes over another sprocket wheel 60 which is journalled on a shaft 61, shown as concentric with operating shaft 64 of a festoon rheostat housing 65. The support means for shafts 61 and 64 have not been shown to permit a clearer illustration of the shafts themselves and facilitate the operational explanation of this mechanism. A lug or rheostat actuator 62 is affixed by screw or similar means to chain 43, and a yoke or bifurcated shaft actuator 63 is affixed to the end of shaft 64 to rotate the movable arm of the festoon rheostat as yoke 63 is turned. Yoke 63 includes a central channel 66, one end of which is flared outwardly in a pair of chamfered sections 67 to provide for positive insertion of lug 62 within channel 66 as the lower set of sheaves is moved upwardly and chain 43 is displaced in a counterclockwise direction around the sprocket wheels to drive lug 62 downwardly. It is evident that after engagement in channel 66 of yoke 63, continued counter-clockwise movement of chain 43 effects a rotation of yoke or actuator 63 through approximately three-quarters of a complete revolution, thereby effecting a corresponding rotation of the movable arm of the festoon rheostat.

A "slow-down" switch assembly 70, supported from vertical mast 69, includes a follower arm 72 which supports a roller 73 at its end, which roller is shown engaging a portion of a crank arm 74. One end of crank 74 is pivoted on a shaft 75 extending from mast 69; shaft 75 may be biased by suitable spring means (not shown) to normally urge crank 74 into the position shown. After lug 62 passes around sprocket wheel 60 in a counter-clockwise direction, displacing yoke 63 from the illustrated position to one of about 270° removed from the illustrated position, continued movement of chain 43 causes engagement of lug 62 with crank 74, displacing the crank and thus forcing follower arm 72 toward slow-down switch 70. Such movement of follower arm 72 effects the operation of switch means (not shown in this illustration) within switch 70, to effect an operation which will be explained fully hereinafter.

A switch actuator or blade 76 is affixed to one end of sheave support 37 by welding, bolts, or other suitable means. Actuator 76 is positioned to deflect, in sequence, as the lower set of sheaves 27 is raised from its extreme low to its highest position, follower arm 77 of "full stop" limit switch 78, follower arm 81 of "speed-up" switch 82, and follower arm 84 of "winder stop" limit switch 85. Each of these switches includes a contact set which are shown in FIGURE 3, and the control operations effected by closure of such contact sets are set forth in detail subsequently. Because actuator 76 is carried directly by sheave support 37, and lug actuator 62 is displaced as a direct function of the movement of sheave support 37, actuation of the various contact sets and adjustment of the festoon rheostat may, in a general sense, be said to be caused by the lower set of sheaves in its vertical movement.

As the lower set of sheaves moves upwardly and downwardly during a cycle of operation, an amount of slack bead material may occur between the upper set of sheaves 24 and the haul-off drum, or between the upper sheaves and the winder drum. Accordingly slack wire take-up devices 22 and 28 are provided to maintain tension between the several portions of the system, and to disable the equipment in the event that the amount of slack exceeds a preset value. Slack wire take-up 28, depicted generally in FIGURE 1, is shown in more detail in FIGURE 2; slack wire take-up 22 is similar to take-up 28, and is omitted from FIGURE 2 to permit the clear showing of other elements. Slack wire take-up 22 is set forth in detail in the above-identified copending application.

With respect to slack wire take-up 28, a strand of bead material 15 is drawn from the upper set of sheaves and led under a first pulley 87 and over a second pulley 88. Pulleys 87 and 88 are journalled for free rotation at opposite ends of a support plate 90 which is centrally pivoted on one end of a shaft 91. Shaft 91 extends through a rotary torque means 92 and a cam 93 is affixed to the opposite end of shaft 91. Rotary torque means 92 supports shaft 91 as shown, and the torque means may include a vane (not shown) in the interior disposed so that air passed through inlet hose 94', through the body of rotary power means 92, and through exit hose 95', provides a continuous torque on shaft 91 in the direction to urge clockwise rotation thereof as shown by the arrow. Accordingly pulleys 87 and 88 maintain a continuous tension on bead material 15. In the event that the bead material breaks, or the amount of slack becomes excessive at this point in the system, under the urging of rotary power means 92, shaft 91 is rotated and cam 93 engages cam follower 94 of limit switch 95 to stop the haul-off motor. One suitable source of torque or rotary power is available under the trade name "Rotac" from the Rotac Division of Ex-Cell-O Corporation, Greenville, Ohio.

Also shown in FIGURE 2 is a manual control unit 100 for the system. The control unit includes a meter 101 which indicates the position of an element shown in FIGURE 3, and such indication is related to the speed of the haul-off motor. Accordingly, the meter may be calibrated to read the speed at which a strand of bead material is drawn from the haul-off motor. Control unit 100 additionally includes knobs for actuating an "on-off" switch 102, a "fast" control switch 104, a "slow" control switch 106, and a "jog control" control switch 108. In addition "reduced speed trim" control knob 110 is positioned on the side of control unit 100. The several switches and the knob are effective to make and break circuits for turning the haul-off motor on and off, speeding up and slowing down the haul-off motor, jogging or intermittently energizing such motor, and for effecting a fine adjustment of the haul-off motor speed when it is running at a comparatively slow speed. The manner in which the control buttons illustrated generally in FIGURE 2 make and break the requisite circuitry to effect these functions will be made clear in connection with the schematic showing of FIGURE 3.

With reference to FIGURE 3, a regulating means or control system for a haul-off motor in accordance with the inventive teaching is shown thereat. In the illustrated embodiment certain of the actuating components and circuit elements are connected to be energized when input terminals 21A are connected to a suitable A.C. supply source, such as a conventional 110 volt, 60 cycle power source. Additionally a D.C. reference voltage may be applied across terminals 112 and 113 on terminal board 111 to establish a given potential distribution across a voltage divider arrangement to be described hereinafter. This potential distribution is then sensed at terminals 112 and 114 and applied to a motor controller unit 180 for regulating the speed of the haul-off motor. As noted above, a control voltage can be utilized for armature and/or field regulation; it could also be used to energize a variable-speed motor directly, or to vary the excitation level of an exciter machine in a Ward-Leonard speed control system or an analogous system in a manner well known and understood in the art. Other systems of utilizing a variable output potential to attain a desired speed control will be suggested to those skilled in the art.

The haul-off control circuit referenced by numeral 20 in FIGURE 1 is depicted in FIGURE 3 as including two major sections. Those components shown below A.C. supply terminals 21A constitute on-off circuit 115, which serves principally to turn the haul-off motor on and off, whereas the components shown above terminals 21A comprise a variable speed circuit 116 which is utilized to vary the speed of the haul-off motor in accordance with the position of the lower sheaves and in response to commands translated from control unit 100.

One of supply terminals 21A is coupled over a fuse 117 to a first source conductor 118, and the other A.C. supply terminal is coupled to a second source conductor 120. The coupling of the source conductors 118, 120 to a control system for winding 126 of festoon brake solenoid 54, motor preparatory relay 127, and haul-off motor 17 is controlled by an energizing circuit which includes a timer having a set of normally-open field-voltage contacts 121, such contacts being connected to be closed responsive to the appearance of the proper energizing potential across the field winding of the haul-off motor, and in addition, only after a predetermined interval preset on timer 122 has elapsed subsequent to application of power to the system.

The energizing circuit for such members is further controlled by slack wire take-up mechanisms 28 and 22, and specifically by two sets of associated normally closed contacts, 123 and 124, which are connected in series with field voltage-timer contacts 121. Slack wire take-up mechanisms 28 and 22 operate to open contacts 123, 124 only when the amount of slack bead material present at the take-up mechanisms exceeds a predetermined safe amount. Contacts 109c of jog switch 108 are connected to bypass contacts 123 and 124 when switch 108 is actuated, to permit string-up in the system when take-up mechanisms 28 and 22 have opened contacts 123 and 124. When contact sets 121, 123 and 124 for the timer mechanism and slack wire take-up mechanisms are closed, an obvious energizing path including a fuse 125 is completed for winding 126 of festoon brake solenoid 54. Accordingly with sufficient bead material in the system and the elapse of a predetermined time interval after the equipment is energized, together with the presence of the proper energizing potential across the field windings of the drive motor, festoon mast brake 47 is placed in the off position, and chain 43 can rotate freely to permit vertical displacement of lower sheaves 27.

Control relay 127 is also connected to be energized when field voltage-timer contacts 121 close, the energizing circuit extending from source conductor 118 over contacts 121, 123, 124, emergency stop switch 130, contacts 109a of jog switch 108, contacts 103a of on-off switch 102 (shown in the normally "off" position), the winding of control relay 127, and overload contacts 132 to the other source conductor 120. Thus, with sufficient bead material in the system, and the proper energizing potential across the field winding of the drive motor, contacts 121, 123 and 124 are closed to energize control relay 127, which operates to close an associated contact set 128.

When control relay 127 operates and closes contacts 128, a portion of an energizing circuit for brake relay 172 is prepared, such energizing circuit still being interrupted both at contacts 103b of on-off switch 102, and at contacts 79 of lower limit switch 78. Contacts 79 are normally closed, but are opened when the lower set of sheaves 27 reaches the lower extent of its travel, and switch actuator 76 (FIG. 2) engages follower arm 77 to open contacts 79.

As the on-off switch 102 is now moved to the on position contacts 103a are opened and contacts 103b are closed. The winder motor is then energized to draw the lower set of sheaves 27 upwardly so that actuator 76 disengages follower arm 77, and contacts 79 are closed. Thus brake relay 172 is energized over the circuit which extends from source conductor 118, over contacts 121, 123, 124, emergency stop switch 130, contacts 128, 103b, 79, armature voltage relay contacts 131, the winding of relay 172, and overload contacts 132 to source conductor 120.

Brake relay 172 in its operation actuates its associated contact sets 173 and 174. Contacts 173 are closed and complete an energizing circuit over conductors 175 to place the haul-off motor brake (not shown) in the off position and thereby permit free rotation of motor 17. Contacts 174 are closed and complete an obvious energizing circuit for motor control relay 176, which operates and closes contact sets 177 and 178. Closure of contacts 178 completes an energizing circuit for haul-off motor 17 which includes conductors 179.

When motor 17 is energized an armature potential develops thereacross, and armature voltage relay contacts 131 are opened. However, relay 172 is maintained energized over a circuit which extends from source conductor 118 over contacts 121, 123, 124, 130, 128, 103b, 79, 177, the winding of relay 172, and overload contacts 132 to source conductor 120. Accordingly relay 176 remains operated over contacts 174, maintaining contacts 178 closed, and thus motor 17 also remains energized. It is noted that if emergency stop switch 130 is depressed, or if either of contact sets 123 and 124 is opened, the energizing circuits for relay 127 and motor 17 are broken. Accordingly, if the emergency stop switch is actuated, it is not possible to energize the equipment again before (1) the haul-off motor has come to a dead stop (closing contacts 131) and (2) switch 102 is turned off and then turned on.

In variable speed circuit 116, a voltage divider arrangement includes four rheostats connected in series across the reference input terminals 112 and 113. Specifically, these rheostats include a reduced speed rheostat 140 having a movable arm 141, a speed-up rheostat 142 having an adjustable arm 143, a festoon rheostat 144 having a movable arm 145, and a slow-down rheostat 146 having an adjustable arm 147. Also included in the voltage divider arrangement is a motor-operated rheostat 148 which has one end connected to movable arm 145 of rheostat 144, and its other end connected to the junction of rheostats 142 and 144 and also connected over normally closed contacts 83a of speed-up switch 82 to the junction of rheostats 140 and 142. The movable arm 150 of rheostat 148 is connected to output terminal 114.

For purposes of explanation of the operation of the invention, it is assumed that as the potential appearing at movable arm 150 of the rheostat 148 approaches the potential of output terminal 112, the speed of the haul-off motor is decreased; in like fashion, as the potential appearing at movable arm 150 approaches that of terminal 113, the speed of the haul-off motor is accordingly increased.

These are two basic ways in which the potential distribution between terminals 112 and 113, and thus the potential appearing at terminal 114 or at movable arm 150 of rheostat 148, can be altered to regulate the speed of the haul-off motor. If the potential distribution across the voltage divider arrangement including rheostats 140, 142, 144, 146, and 148 is altered, the potential appearing at movable arm 150 necessarily will vary in accordance with such alteration. Alternatively, if the distribution of potential across the voltage divider arrangement is maintained constant, and the position of movable arm 150 is changed, a control effect for regulating the haul-off motor speed is likewise produced.

To effect changes in the position of movable arm 150 of rheostat 148, arm 150 is coupled to a reversible motor 160, which has a "fast" winding 161 and a "slow" winding 162. Energization of fast winding 161 drives movable arm 150 in a direction to increase the haul-off motor speed, which is to the right in FIGURE 3, so that the potential at arm 150 approaches that of terminal 113. Conversely, as slow winding 162 is energized, motor 160 drives potentiometer arm 150 in the opposite direction to decrease the haul-off motor speed, which is to the left as shown in FIGURE 3, so that arm 150 approaches the potential of terminal 112.

Windings 161 and 162 are connected together at one end to movable arm 164 of a sensitivity control potentiometer 165, which is in turn coupled across A.C. source terminals 21A, arm 164 and conductor 118 providing the energizing potential for motor 160.

The fast winding 161 of motor 160 can be energized over either of two alternative energizing circuits including arm 164 and conductor 118. As shown in FIGURE 3, the first of these circuits includes source conductor 118, normally open contacts 83b of speed-up switch 82 (controlled by the moving support actuator 76), normally closed contacts 107b of slow switch 106 in manual control unit 100, fast winding 161 and movable arm 164 of potentiometer 165. An alternative energizing circuit includes normally open contacts 105a of fast switch 104 in control unit 100, shown connected in parallel with contacts 83b. With respect to FIGURE 2, when the lower set of sheaves is driven vertically so that switch actuator 76 engages follower arm 81 of speed-up switch 82, follower arm 81 is deflected to close contacts 83b in FIGURE 3, completing the above-described energizing circuit for fast winding 161 of motor 160, energizing this motor and driving movable arm 150 of rheostat 148 in a direction to increase the speed of the haul-off motor and supply more material to the festoon. Alternatively the operator may actuate fast switch 104 to close contacts 105a and likewise complete the energizing circuit for fast winding 161 to produce a speed-up of the haul-off motor. It is noted that when fast switch 104 is actuated, contacts 105a are closed and simultaneously contacts 105b in the energizing circuit for slow winding 162 are opened, to prevent concomitant completion of the fast and slow energizing circuits for motor 160.

It is also noted that, at the same time contacts 83b are closed to change the position of movable arm 150 of the motor-driven rheostat, contacts 83a are opened as the follower of speed-up switch 82 is engaged. When contacts 83a open, the short circuit provided thereby across rheostat 142 is removed, and the potential at movable arm 150 of rheostat 148 changes in a direction approaching the potential of terminal 113. Accordingly, an instantaneous but temporary change, in the nature of a step function, of potential at arm 150 is provided, to immediately increase the speed of haul-off motor 17 while motor 160 is driving arm 150 to effect a gradual change in the speed of the haul-off motor.

Similar energizing circuits are provided for slow winding 162 of motor 160. Winding 162 is energized over a circuit extending from source conductor 118, over either contacts 71b of slow-down switch 70 (which is controlled by lug 62 on chain 43) or contacts 107a of slow switch 106 on manual control unit 100, over contacts 105b, and winding 162 to the movable arm of sensitivity potentiometer 165.

Whenever slow switch 106 is actuated by depressing the button on control unit 100, contacts 107a are closed to complete the energizing circuit for winding 162, causing motor 160 to drive movable arm 150 to the left as shown in FIGURE 3 to cause the potential at this point to change in a direction approaching that of terminal 112, thereby decreasing the speed of the haul-off motor. Simultaneously with closure of contacts 107a, contacts 107b are opened to prevent concomitant energization of fast winding 161.

In the alternative, after lug 62 (FIG. 2) on chain 43 has engaged yoke 63 and driven it counterclockwise through about 270° to move the position of the festoon rheostat from that shown in FIGURE 3 to a position where movable arm 145 is near the other end of the rheostat, continued upward movement of the lower set of sheaves causes lug 62 to engage crank 74, thus closing contacts 71b and opening contacts 71a within slowdown switch 70; closure of contacts 71b completes the energizing circuit for slow winding 162, causing motor 160 to drive movable arm 150 to the left as shown in FIGURE 3, to slow the haul-off motor accordingly. Concomitantly with this gradual position change of rheostat arm 150, the opening of contacts 71a inserts rheostat 146 in the voltage divider arrangement coupled across terminals 112 and 113. Accordingly the potential distribution across the described voltage divider arrangement is changed and the potential now appearing at movable arm 150 is changed in a direction approaching the potential of terminal 112. Thus an immediate potential change has been provided at arm 150 so that the haul-off motor is instantaneously slowed a certain amount, even while motor 160 is driving arm 150 to effect a gradual speed reduction of the haul-off motor.

Manifestly the value of such step changes of potential at arm 150 cannot be too great if system stability and smooth operation of the let-off equipment (FIGURE 1) are to be maintained. Accordingly, the amount of potential change effected when contacts 83a are opened in response to actuation of speed-up switch 82 is adjusted by varying the position of adjustable arm 143 of speed-up rheostat 142; in like manner, adjustable arm 147 of slow-down rheostat 146 is moved to regulate the amount of potential change realized by opening contacts 71a. Neither of these two last described adjustments is available to the operator, but they are set when the equipment is manufactured to govern the amount of instantaneous speed change effected when switch 70 or 82 is actuated.

The exact form of the speed regulation circuit for winder motor 31, referenced by numeral 33 in FIGURE 1, is not germane to the description of the manner in which the haul-off motor speed is adjusted as the position of the lower sheaves is varied. However, stop switch 85 of the festoon arrangement is connected in the on-off circuit for winder motor 31, as shown in FIGURE 4. The energizing circuit for winder motor 31 includes both the normally closed contacts 86 of limit switch 85 and stop switch 170. Motor 31 is deenergized either when stop switch 170 is actuated or contacts 86 are opened responsive to engagement of follower arm 84 of limit switch 85 by switch actuator 76 in the upward movement of lower sheaves 27.

*Operating Sequence—Automatic Winder*

In the previous description of the automatic and Universal types of winding apparatus, it was emphasized that the automatic type operation is extremely rapid, and a complete bead-building cycle can be accomplished in only three seconds. With the haul-off drum operating at a practically constant speed in comparison to the wide variation of winder speed, large oscillations in the position of the lower sheaves are necessarily encountered. Accordingly it is desired in automatic operation to effect minute adjustments of the haul-off speed when the switches adjacent the festoon are actuated by actuators 62 and 76 as the lower sheave support 37 travels upwardly and downwardly. Because the winder machine accelerates rapidly from a dead stop, it is desirable in automatic operation that the festoon rheostat be driven through its travel to accelerate the haul-off motor after the lower sheaves have been raised only a slight amount from the full down position. To obtain such operation, lug 62 should be positioned on chain 43 in the position indicated in dotted line in the perspective illustration of FIGURE 2.

The inventive control system is operative, after the equipment has first been energized and warmed up while haul-off control switch 102 remains in the off position, to condition the equipment for operation by energizing the mast brake release solenoid and operating control relay 127 to prepare an energizing circuit for haul-off motor 17.

After on-off switch 102 has been actuated to close contacts 103b and winder motor 31 has been energized to draw the lower set of sheaves upwardly and close contacts 79, haul-off motor 17 operates at a speed which is basically regulated by the position of arm 141 of rheostat 140. Subsequent variations of haul-off speed control are effected as festoon rheostat 144 has its effective resistance changed by engagement of lug 62 and yoke 63, as the lug subsequently displaces crank arm 74 of slow-down switch 70, and as switch actuator 76 engages the follower arms of speed-up switch 82 and winder stop switch 85. Additional speed control of the haul-off motor includes both the step functions and the gradual adjustments effected by adjusting the position of movable arm 150 of rheostat 148, the continued operation of such members effecting a smooth feed of the strand of bead material through the system to the winder drum. A specific description of the control effected by such members is now set forth.

After the equipment is energized by throwing a main power switch not shown in the diagrams, timer motor 122 (FIGURE 3) commences to run and, at the end of a predetermined interval, provided that the necessary field voltage is present at the haul-off motor field winding, contacts 121 are closed. Responsive to closure of contacts 121 at the expiration of the warm-up interval, an energizing circuit for brake solenoid 54 is completed from source conductor 118 over contacts 121, 123, 124, fuse 125, winding 126 of brake solenoid 54, to source conductor 120. Accordingly, the brake solenoid is energized and mechanical festoon brake 47 is held in the off position to permit free rotation of shaft 45, thus permitting vertical ascent and descent of the lower set of sheaves.

Closure of contacts 121 also completes an energizing circuit for control relay 127 which extends from source conductor 118, over contacts 121, 123, 124, emergency stop switch 130, contacts 109a, 103a, the winding of control relay 127, and overload contacts 132 to the other source conductor 120. It is noted that the haul-off motor switch 102 must remain in the off position at this time to complete the energizing circuit for relay 127. When relay 127 operates, contacts 128 are closed to by-pass contacts 109a and 103a, thus maintaining control relay 127 energized notwithstanding the subsequent displacement of on-off switch 102.

After relay 127 operates, and start switch 102 is displaced to close contacts 103b, motor 17 is still not energized because contacts 79 of full-stop limit switch 78 remain open. Contacts 79 remain open so long as the lower set of sheaves 27 is in the full down position, with switch actuator 76 riding follower arm 77 of limit switch 78.

When winder motor 31 is energized, winder drum 30 begins to rotate and to draw material from festoon 23, thus moving the lower set of sheaves 27 upwardly and closing contacts 79. At this time relay 172 is operated over a circuit which includes source conductor 118, contacts 121, 123, 124, emergency stop switch 130, contacts 128, 103b, 79, 131, relay 172, and contacts 132 to source conductor 120. Operation of relay 172 closes contacts 174, and relay 176 operates. Thus contacts 178 are closed and motor 17 is energized.

Motor 17 begins to rotate and an armature voltage appears thereacross, thus opening armature voltage contacts 131. However, holding contacts 177 are closed which complete the holding circuit across contacts 131 and maintain the energizing circuit for relays 172 and 176 and the haul-off motor.

As soon as motor 17 commences driving haul-off drum 16, on-off circuit 115 of FIGURE 3 is effective only to maintain energization of this motor, and speed control is effected by variable speed circuit 116 shown in the upper portion of FIGURE 3. As soon as motor 17 is energized its speed is regulated by the potential distribution across rheostats 140, 142, 144, 146, and 148, as sensed by the movable arm 150 of rheostat 148. Just after the equipment starts, the haul-off motor is running at a relatively slow speed which can be adjusted by reduced speed trim control 110 on control unit 100 (FIGURE 2), which is effective to change the resistance inserted by rheostat 140 in the voltage divider arrangement and thus alter the potential distribution.

As the winder increases its speed to draw more material from the festoon than is stored thereon from the haul-off drum, the lower set of sheaves 27 is displaced upwardly as shown in FIGURE 2. Continued rise of lower sheaves 27 effects the rotation of chain 43 in the counterclockwise direction. Accordingly lug 62 on the chain is driven downwardly to enter chanel 66 of yoke 63 and drive the yoke in a counterclockwise direction, thereby altering the position of festoon rheostat arm 145 from that shown in FIGURE 3 to a position near the opposite end of the rheostat. Such movement effects a change in the potential at movable arm 150 in a direction to approach the voltage of terminal 113, thereby increasing the speed of the haul-off motor. After lug 62 leaves yoke 63, the speed of the haul-off motor is determined principally by the setting of arm 150 on motor-operated rheostat 148, subject to modification by actuation of the several limit switches and manual operation of the different control switches on control unit 100.

Assuming that the lower set of sheaves continues to rise, lug 62 momentarily engages crank 74, which in turn displaces roller 73 and follower arm 72 of slow-down switch 70 to open contacts 71a (FIGURE 3) and simultaneously close contacts 71b in a rapid pulsing operation. Accordingly the effective resistance of rheostat 146 is inserted in the voltage divider arrangement between terminals 112 and 113, thereby shifting the potential at movable arm 150 of rheostat 148 toward the potential of terminal 112, and effecting a decrease in the speed of the haul-off motor; simultaneously contacts 71b have completed an energizing circuit for slow winding 162 to drive movable arm 150 toward the left as shown in FIGURE 3, effecting a gradual speed reduction of the haul-off equipment.

The indicator of meter 101 of control unit 100, calibrated to indicate the flow of material from the haul-off drum to the festoon in feet per minute, is actually positioned in accordance with the setting of movable arm 150 of motor-operated rheostat 148. This is done because, after the festoon rheostat has been moved completely through its effective control range by lug 62, the speed of the motor essentially depends upon the setting of movable arm 150, and therefore this setting is translated into a visual indication for the operator of the equipment.

As the winder speed continues to exceed the speed at which material is stored on the festoon system by a substantial amount, the lower set of sheaves is driven upwardly even farther and switch actuator 76 engages follower arm 81 of speed-up switch 82, thereby opening contacts 83a and closing contacts 83b in FIGURE 3. Opening contacts 83a effectively inserts rheostat 142 in the voltage divider arrangement; there is an instantaneous change of potential at movable arm 150 in a direction approaching that of terminal 113 to speed up the haul-off motor, while closure of contacts 83b is simultaneously effective to complete the energizing circuit for fast winding 161 and drive arm 150 in a direction to gradually increase the speed of the haul-off motor. Alternatively, the operator, remembering the previous set-up of the equipment gave a substantially lower speed indication on meter 101, can push fast control switch 104 on control unit 100 to thereby close contacts 105a and open contacts 105b in FIGURE 3, thus increasing the speed of the haul-off motor. A similar control is available with slow button 106, so that the speed of the haul-off motor can be slowed to avoid extreme downward movement of the lower set of sheaves to engage follower arm 77 of full stop limit switch 78, and preclude shutting off haul-off motor 17.

If the increase of haul-off motor speed afforded by engagement of speed-up limit switch 82 and/or manual displacement of the fast button on control unit 100 is not sufficient to bring the haul-off speed into approximate conformance with the average speed of the winder over a complete cycle, continued upward travel of lower sheaves 27 causes switch actuator 76 to engage follower arm 84 of stop limit switch 85, thus opening contacts 86 (FIGURE 4) and disabling winder motor 31 until the haul-off motor in its continued operation again stores sufficient material on the festoon itself to permit the downward movement of the lower set of sheaves 27 and consequent release of follower arm 84 of stop limit switch 85.

The upward movement of the lower set of sheaves in the festoon in automatic operation is to be expected during the initial portion of the bead-building cycle, while the winder drum is being accelerated from a dead stop to its maximum speed. During the next portion of the winding cycle, winder motor 31 is slowed to reduce the speed of winder drum 30, and the lower set of sheaves moves downwardly as shown in FIGURE 2. When switch actuator 76 reaches slow-down switch 70, lug 62 engages crank 74 to open contacts 71a and close contacts 71b, thereby slowing the haul-off motor as described hereinabove.

If the lower set of sheaves 27 descends farther, lug 62 next engages yoke 63 and displaces the movable arm of festoon rheostat 144 in a direction to gradually slow the haul-off motor even more and thus slow the descent of the lower set of sheaves. During automatic winder operation, lug 62 should engage yoke 63 when the lower sheaves are descending only (1) if the winder is shut off, or (2) for a few cycles of oscillation of the lower sheaves immediately after starting the winder with the haul-off speed setting (position of arm 150 on rheostat 148) considerably too fast. Normally the lower sheaves oscillate between switches 70 and 82 during automatic operation. If the haul-off speed is initially too fast, it is soon corrected by the repeated closing of contacts 71b as the lower sheaves pass switch 70 in each direction. The time interval between successive cycles in automatic type operation is sufficiently short so that full-stop limit switch 78 is not engaged, and the haul-off motor is not stopped.

If, during operation of the bead-building system, the bead material between the upper set of sheaves 24 and winder drum 30 should break, or if an excessive amount of slack should develop in this portion of the system, rotary torque means 92 effects rotation of shaft 91 in the clockwise direction as shown in FIGURE 2, thereby causing cam 93 to engage follower arm 94 of switch 95; such action is effective to open contacts 123 and interrupt both the energizing circuit for motor 17 and the energizing circuit for brake solenoid 54. Accordingly the haul-off motor is instantly deenergized, and mechanical brake 47 is applied. Thus shaft 45 is locked in position, and sprocket wheel 44 fixes the position of chain 43 and prevents the lower set of sheaves 27 from dropping downwardly under the weight of sheave support 37. Such operation prevents a shock on the equipment caused by the falling of the weighted sheave assembly, and such dropping normally causes most of the "string-up," or the amount of bead material between extrusion head 13 and winder drum 30, to be unwound. By keeping the main portion of the string-up on the festoon, it is substantially easier to again thread the system and commence operation after a break in bead material occurs.

It is evident that if a corresponding amount of slack develops, or if the bead material breaks between upper sheaves 24 and haul-off drum 16, slack wire take-up 22 is actuated to open contacts 124 and produce an exactly similar disablement of haul-off motor 17 and application of mechanical brake 47.

Jog switch 108 on control unit 100 is effective to close contacts 109b to complete the required energizing circuits for motor 17 even when control relay 127 is not actuated, and when contact sets 123 and 124 are not held closed by bead material entering and leaving the festoon. Such intermittent operation of motor 17 is useful to provide slack material for effecting string-up preparatory to operation of the complete system.

*Operating Sequence—Universal Operation*

The bead-building apparatus which is commercially available from the assignee of the present invention is exceedingly versatile, and the invention itself is likewise versatile to permit regulation of winder machines either in automatic or Universal operation. In contradistinction to the rapid acceleration and deceleration of the winder machine in the automatic cycle of operation, which may last for as little as three seconds, in Universal operation the winder is run at a nearly constant speed for an interval ranging from a few seconds in duration to over a minute; the winder is then stopped for approximately two to ten seconds to permit manual removal of the finished bead. Because the speed is nearly constant, there need only be a small interval of movement of the lower sheaves between the positions at which slow-down switch 70 and speed-up switch 82 are actuated. In addition, after the winder has been halted and the lower sheaves descend as more bead material is stored thereon, it is desirable that the festoon rheostat be actuated to slow the haul-off motor considerably sooner than is the case in automatic operation, to provide a longer interval of reduced haul-off speed for manual removal of the bead without completely stopping the haul-off motor and thus preclude the formation of lumps or bubbles in the extruded bead material.

A salient feature of the present invention is the simple and positive manner in which the invention is adapted for operation with either automatic or Universal type winders. In accordance with the invention, lug 62 on chain 43 is moved from the dotted line to the solid line position as shown in FIGURE 2 to convert the inventive control apparatus for use in Universal type operation. In such position there is only about six inches of movement of the lower sheaves between the interval where actuator 76 actuates speed-up switch 82 and the interval in which lug 62 actuates slow-down switch 70. Moreover, as is evident from FIGURE 2, relocation of lug 62 provides a greater extent of movement of the lower sheaves between the full down position and the position where lug 62 rotates movable arm 145 of festoon rheostat 144 to accelerate the equipment in the initial portion of the Universal cycle. Accordingly there is a similar extended movement after the rheostat has been returned to the original position to decelerate the haul-off motor as the lower sheaves descend in response to the stopping of the winder motor.

The equipment of the invention is entirely the same for regulating both automatic and Universal winders except for the change of position of lug 62 referred to above. Accordingly for Universal winder operation, the equipment is energized and after the preset interval determined by timer 122 has elapsed, on-off switch 102 is displaced to the on position and the winder motor is started to commence the bead-building cycle. The lower sheaves rise during the initial portion of the cycle, and the reduced speed of the haul-off motor in this part of the cycle is maintained until lug 62 engages yoke 63 to rotate movable arm 145 of festoon rheostat 144. If the speed setting of the haul-off motor, as indicated by the position of movable arm 150 of motorized rheostat 148, is sufficiently fast, the festoon rheostat will not be completely rotated before an adequate speed of the haul-off motor is reached. If the setting of the motorized rheostat arm is slightly too slow, the lower sheaves continue to rise and lug 62 momentarily pulses crank 74 of slowdown switch 70 as it passes, to slightly slow the equipment. The system then modulates slowly between the positions of slow-down switch 70 and speed-up switch 82 until the end of the cycle. Of course, if the speed of the equipment is at considerable variance from that required in the last set-up of the equipment, the operator can actuate the various switches in control unit 100 as described above in connection with automatic winder operation.

When the Universal winder is shut down at the end of the cycle, lug 62 very soon rotates the movable arm of festoon rheostat 144 to decelerate the haul-off motor, and there is a considerable time of reduced haul-off speed before the lower sheaves can descend sufficiently to actuate haul-off stop switch 78. This gives the operator sufficient time to remove the bead and restart the winder before the festoon becomes completely filled and before switch 78 is actuated, and at the same time does not slow the haul-off motor to the extent that the extrusion of the rubber in the extrusion head is appreciably affected.

Conclusion

It is evident that the invention provides a festoon or material storage system in which excessive oscillations of the system are precluded by exercising a degree of control over the speed of the haul-off motor. This speed is adjustable automatically and/or manually by the operator as the lower set of sheaves in the festoon is varied between its limits of oscillation. The speed control operations are initiated as the several switches and the festoon rheostat are displaced by blade actuator 76 and lug actuator 62 at different intervals in the vertical movement of lower sheaves 27. "Interval" as used herein and in the appended claims in describing the upward and downward travel of lower sheaves 27, defines a vertical movement of those sheaves less than the complete distance between the point where switch actuator 76 engages arm 84 of winder stop switch 85 and the point where actuator 76 engages arm 77 of haul-off stop switch 78. An important element of the inventive combination is the inclusion of the festoon rheostat and its operation only through an interval of the movement of the lower set of sheaves; this operation can be adjusted to occur in different intervals of the festoon travel to permit operation either with fully automatic bead-builder apparatus or in connection with Universal bead-formers simply by changing the position of a lug on a driven chain.

Although a particular embodiment of the invention has been shown and described, it is apparent that modifications and alterations may be made therein, and it is intended in the appended claims to cover all such modifications and alterations as may fall within the true spirit and scope of the invention.

What is claimed is:

1. A material handling system comprising: a material storage device for storing at least one strand of material including a fixed member and a movable member separated by a distance which is variable between maximum and minimum positions of said movable member relative to said fixed member, the amount of strand material stored thereon being different as the distance between the fixed and movable member is varied; an input means operable to feed material to said material storage device; an output means operable to draw material from said storage device at a variable velocity to satisfy variable load demands, the distance between the fixed and movable members varying whenever the velocity of feed to said storage device is different from the velocity of take-off by said output means; means positioned adjacent said material storage device to initiate an increase in the velocity of feed of said input means at a preassigned interval of movement of said movable member from its maximum position toward its minimum position with respect to said fixed member; first switch means positioned adjacent said material storage device for actuation responsive to movement of said movable member to decrease the velocity of feed on said input means upon movement of said movable member beyond said preassigned interval of movement towards said fixed member; and second switch means positioned adjacent said material storage device for actuation responsive to movement of said movable member to increase the velocity of feed on said input means upon movement of said movable member at a second preassigned interval of movement in advance of the minimum position of said movable member with respect to said fixed member.

2. A material handling system comprising: a material storage device for storing at least one strand of material including a fixed member and a movable member separated by a distance which is variable between maximum and minimum positions of said movable member relative to said fixed member, the amount of strand material stored thereon being different as the distance between the fixed and movable member is varied; an input means operable to feed material to said material storage device; an output means operable to draw material from said storage device at a variable velocity to satisfy variable load demands, the distance between the fixed and movable members varying whenever the velocity of feed to such storage device is different from the velocity of take-off by said output means; regulator means positioned adjacent said material storage device to initiate an increase in the velocity of feed of said input means at a first preassigned interval of movement of said movable member from its maximum position toward its minimum position with respect to said fixed member, and a decrease in the velocity of feed of said input means upon movement of said movable member over said first preassigned interval of movement of said movable member toward its maximum position; first switch means positioned adjacent said material storage device for actuation responsive to movement of said movable member to decrease the velocity of feed of said input means upon movement of said movable member beyond said first preassigned interval of movement toward said fixed member; and second switch means positioned adjacent said material storage device for actuation responsive to movement of said movable member to increase the velocity of feed of said input means upon movement of said movable member at a second preassigned interval of movement in advance of the minimum position of said movable member with respect to said fixed member.

3. A material handling system according to claim 2 characterized by the provision of actuator means disposed for vertical movement as a function of the movement of said movable member for actuating said regulator means, and means for adjusting the position of said actuator means to modify the location of said first preassigned interval of movement of said movable member.

4. A material handling system comprising: a festoon for storing at least one strand of material including a fixed upper set of sheaves and a movable lower set of sheaves separated by a distance which is variable between maximum and minimum values, the amount of strand material stored thereon being different as the distance between the upper and lower set of sheaves is varied; haul-off means operable to feed material to said festoon; winder means operable to draw material from said festoon at a variable velocity to satisfy variable load demands, the distance between the upper and lower set of sheaves varying whenever the velocity of feed to said festoon is different from the velocity of take-off by said winder means; means including a festoon rheostat positioned adjacent said festoon to initiate an adjustment of the haul-off velocity toward the value of the winder velocity responsive to movement of said lower set of sheaves at a first preassigned interval in its movement; a slow-down switch positioned adjacent said festoon for actuation responsive to movement of said lower set of sheaves at a second preassigned interval as said variable distance increases toward said maximum value to initiate a reduction in the haul-off velocity to thereby reduce the rate at which said variable distance approaches said maximum value; and a speed-up switch positioned adjacent said festoon for actuation responsive to movement of said lower set of sheaves at a third preassigned interval as said variable distance decreases toward said minimum value to initiate an increase in the haul-off velocity to thereby reduce the rate at which said variable distance approaches said minimum value.

5. A material handling system comprising: a material storage device for storing at least one strand of material including a fixed member and a movable member separated by a distance which is variable between maximum and minimum values, the amount of strand material stored thereon being different as the distance between the fixed and movable member is varied; an input means operable to feed material to said material storage device; an output means operable to draw material from said storage device at a variable velocity to satisfy variable load demands, the distance between the fixed and movable members varying whenever the velocity of feed to said storage device is different than the velocity of take-off by said output means; actuator means disposed for vertical movement as a function of the movement of said movable member; and regulator means including a voltage divider arrangement and output means coupled thereto for adjusting said feed velocity in accordance with the potential distribution across said voltage divider, and means including a switch positioned adjacent said material storage device operable to selectively change said potential distribution and thereby provide alternatively acceleration and deceleration of said input means toward the value of said take-off velocity responsive to actuation by said actuator means at a preassigned interval in its vertical movement.

6. In a bead-building system comprising a festoon for storing bead material thereon, including stationary upper sheaves and lower sheaves vertically movable between upper and lower extreme positions as the amount of stored bead material is varied, a haul-off drum including motor means for driving said drum to feed said bead material from said drum to said festoon, and a winder drum driven at a variable angular velocity for drawing bead material from said festoon at varying rates in the formation of a bead, variations in said winder angular velocity with respect to the angular velocity of the haul-off drum effecting a concomitant change in the amount of stored bead material and thus causing vertical oscillation of said lower sheaves, the improvement which comprises: actuator means positioned for vertical movement in relation to the vertical movement of said lower sheaves; and regulator means including a voltage divider arrangement and output means coupled thereto for adjusting said feed velocity in accordance with the potential distribution across said voltage divider, a rheostat connected in said voltage divider arrangement, a reversible motor connected to change the effective resistance of said rheostat and correspondingly change said potential distribution as said motor is selectively energized, and switch means positioned adjacent said festoon to selectively energize said motor and change the effective resistance of said rheostat to correspondingly change said potential distribution and thereby alternatively increase and decrease the angular velocity of said haul-off drum in a direction to reduce vertical movement of said lower sheaves responsive to actuation by said actuator means at a preassigned interval in its vertical movement.

7. In a bead-building system comprising a festoon for storing bead material thereon, including stationary upper sheaves and lower sheaves vertically movable between upper and lower extreme positions as the mount of stored bead material is varied, a haul-off drum including motor means for driving said drum to feed said bead material from said drum to said festoon, and a winder drum driven at a variable angular velocity for drawing bead material from said festoon at varying rates in the formation of a bead, variations in said winder angular velocity with respect to the angular velocity of the haul-off drum effecting a concomitant change in the amount of stored bead material and thus causing vertical oscillation of said lower sheaves, the improvement which comprises: a control system for regulating the speed of said motor means including a rheostat motor having a movable arm and a pair of alternate energizing circuits for positioning said movable arm in accordance with the desired speed of said motor means; and switch means actuable responsive to vertical movement of said lower sheaves for selectively completing said alternate energizing circuits and displacing said movable arm to regulate the speed of said motor means.

8. A bead building apparatus according to claim 7 in which said switch means are disposed at predetermined intervals in fixed vertical sequence adjacent said festoon to selectively complete said alternate energizing circuits for said rheostat motor and thus regulate the speed of said motor means as said lower sheaves are vertically displaced to positions adjacent said predetermined intervals.

9. A bead-building system according to claim 7 in which said control system comprises a voltage divider arrangement including a resistance connected in series with said rheostat and having a given potential distribution thereacross, actuation of one of said switch means being effective to instantly change said potential distribution and simultaneously complete an alternate one of said energizing circuits, to instantly change the speed of said motor means and simultaneously commence displacement of the movable arm of said rheostat to effect a gradual change of said potential distribution and a corresponding change in the speed of said motor means.

10. In a bead-building system comprising a festoon for storing bead material thereon, including stationary upper sheaves and lower sheaves vertically movable between upper and lower extreme positions as the mount of stored bead material is varied, a haul-off drum including motor means for driving said drum to feed said bead material from said drum to said festoon, and a winder drum driven at a variable angular velocity for drawing bead material from said festoon at varying rates in the formation of a bead, variations in said winder angular velocity with respect to the angular velocity of the haul-off drum effecting a concomitant change in the amount of stored bead material and thus causing vertical oscillation of said lower sheaves, the improvement which comprises: a control system for regulating the speed of said motor means including a voltage divider arrangement comprising a speed-up rheostat, a festoon rheostat, a slow-down rheostat, each of which includes a movable arm, all connected in series circuit between a pair of input terminals, and a motor-operated rheostat having one terminal coupled to one of said input terminals and another terminal coupled to the movable arm of said festoon rheostat, said motor-operated rheostat further having a movable arm coupled to an output terminal; a reversible rheostat motor including a fast field for driving said rheostat motor in one direction and a slow field for driving said rheostat motor in the opposite direction, connected to drive the arm of said motor-operated rheostat as said fields are selectively energized; a first switch means actuable responsive to movement of said lower sheaves for inserting said slow-down rheostat in said voltage divider arrangement and simultaneously energizing the slow field of said rheostat motor to displace the arm of said motor-operated rheostat in a direction to slow said motor means; and a second switch means actuable responsive to movement of said lower sheaves for disconnecting said motor-operated rheostat from said one reference terminal and simultaneously energizing the fast field of said rheostat motor to displace the arm of said motor-operated rheostat in a direction to speed up said motor means.

11. In a bead-building system comprising a festoon for storing bead material thereon, including stationary upper sheaves and lower sheaves vertically movable between upper and lower extreme positions as the mount of stored bead material is varied, a haul-off drum including motor means for driving said drum to feed said bead material from said drum to said festoon, and a winder drum driven at a variable angular velocity for drawing bead material from said festoon at varying rates in the formation of a bead, variations in said winder angular velocity with respect to the angular velocity of the haul-off drum effecting a concomitant change in the amount of stored bead material and thus causing vertical oscillation of said lower sheaves, the improvement which comprises: a control system for regulating the speed of said motor means including a pair of input terminals and an output terminal; a voltage divider arrangement including a speed-up rheostat, a festoon rheostat, a slow-down rheostat, each of which includes a movable arm, all connected in series circuit between said input terminals, and a motor-operated rheostat having one terminal coupled to one of said input terminals and another terminal coupled to the movable arm of said festoon rheostat, said motor-operated rheostat further having a movable arm coupled to said output terminal; a reversible rheostat motor including a fast field for driving said motor in one direction and a slow field for driving said motor in the opposite direction, connected to drive the arm of said motor-operated rheostat; a first switch means actuable responsive to movement of said lower sheaves for inserting said slow-down rheostat in said voltage divider arrangement and simultaneously energizing the slow field of said rheostat motor to displace the arm of said motor-operated rheostat in a direction to slow said motor means; a second switch means actuable responsive to movement of said lower sheaves for disconnecting said motor-operated rheostat from said one input terminal and simultaneously energizing the fast field of said rheostat motor to displace the arm of said motor-operated rheostat in a direction to speed up said motor means; and a control unit, including a third switch means connected to energize the slow field of said rheostat motor to displace the arm of said motor-operated rheostat in a direction to slow said motor means responsive to actuation of said third switch, and a fourth switch means connected to energize the fast field of said rheostat motor to displace the arm of said motor-operated rheostat in a direction to speed up said motor means responsive to actuation of said fourth switch.

References Cited in the file of this patent

UNITED STATES PATENTS

| | | |
|---|---|---|
| 2,760,734 | Hornberger | Aug. 28, 1956 |
| 2,825,512 | Andren | Mar. 4, 1958 |